June 3, 1930.                R. W. RYDER                1,761,591
SPIRAL CONVEYER COUPLING
Filed May 31, 1928
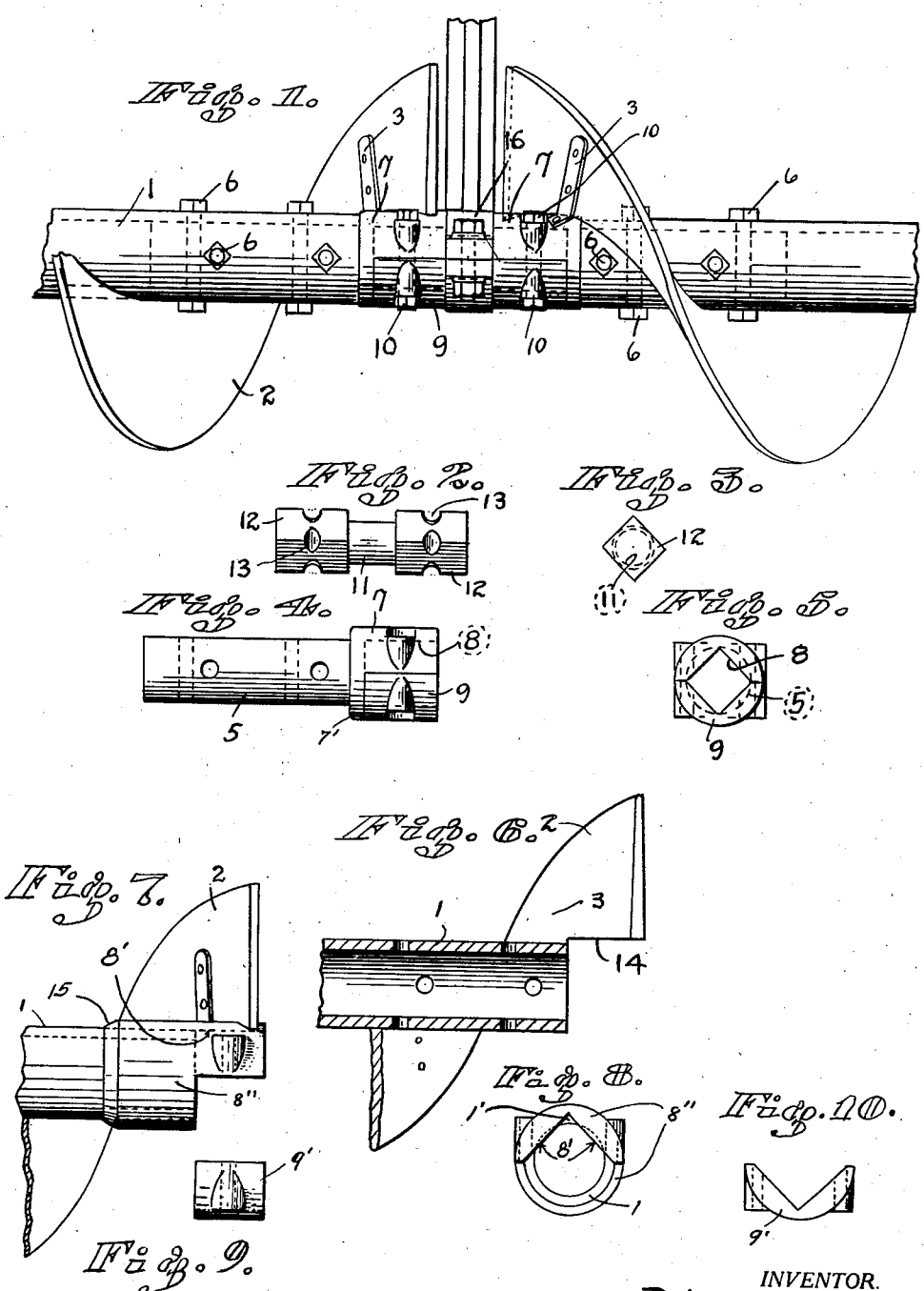
INVENTOR.
Robert W. Ryder
BY Miller & Boyken
ATTORNEYS.

Patented June 3, 1930

1,761,591

UNITED STATES PATENT OFFICE

ROBERT W. RYDER, OF SAN FRANCISCO, CALIFORNIA

SPIRAL-CONVEYER COUPLING

Application filed May 31, 1928. Serial No. 281,684.

This invention relates to spiral or screw conveyers as used in industrial plants to screw a quantity of material such as cement, sugar, etc, along a trough or what is known as a conveyer box. Such conveyers are made in what are known as "flights", each consisting of a piece of pipe about 10 or 12 feet long and around the outer surface of which is secured a spiral fin of metal to constitute the screw blade for forcing the material along when the flight is revolved.

These flights are connected end to end sometimes for a greath length, and the connection is made by slipping a bar within the confronting ends of two flights and securing the bar in place by bolts passed transversely through the pipe and bar. A portion of the bar is exposed between each two pipe ends to constitute the bearings on which the run of conveyor is revolvably supported in hangers.

Such couplings give trouble as it is well nigh impossible to move the bar endwise in the pipes to remove a flight or repair the joint in case the bolts shear off, or for any other purpose, especially if the joint has also become badly rusted through running the conveyer in wet material.

One object of my invention is to provide a coupling joint for spiral conveyer flights which may be taken apart or disconnected by removal in a lateral direction and which will therefore require no longitudinal slipping of rusted or broken parts. Another object is to provide a stronger joint than produced by the construction formerly used.

Briefly described my improvement comprises providing a plug for the end of each pipe to be permanently secured thereto and each plug having a socket at its end fitted with a removable side wall, and a short connecting bar adapted to be dropped laterally into place in the sockets when their side walls or plates are off, and to be clamped firmly in place when the side walls are on, this bar to also constitute the conveyer bearing on which the conveyer runs.

In the drawings accompanying this application Fig. 1 is a side elevation of the confronting ends of a pair of spiral conveyer flights coupled by means of my improved coupling.

Fig. 2 is a detached side view of the short connecting bar.

Fig. 3 is an end view of Fig. 2.

Fig. 4 is a side view of one of the plugs with its side opening socket at the end.

Fig. 5 is an end view of Fig. 4.

Fig. 6 is a sectional view of one end of the conveyer flight showing how its spiral fin is cut back so as to provide space for the socket plug.

Figs. 7 to 10 show an optional construction of the socket.

In further detail the conveyer core or pipes are shown at 1, the spiral fins 2 secured to the pipe either by welding or by means of a series of posts 3.

Tightly fitted into the end of each pipe is a plug 5 secured in place as by transverse rivets or bolts 6, and the ends of these plugs are enlarged as at 7 into the form of a socket 8 with a removable side piece or cap 9 secured by bolts 10.

The socket 8 may be round, hexagon or square, preferably the latter as shown and with the side cap 9 parted at the diagonal corners of the square so as to embrace two sides of a right angle (as shown in Fig. 5).

The short connecting bar which fits into these sockets, shown detached in Fig. 2 consists of a round shank 11 to serve as a bearing and with enlarged square heads 12 at both ends. The square heads are adapted to be clamped within the sockets by means of the caps 9, and the corners of the square portions are notched out as at 13; by turning a circumferential groove around each one on a lathe; so as to pass the cap bolts 10 and thereby prevent pulling out of the heads from the sockets so that a set of conveyers thus connected will resist a tension if required.

The end of the conveyer flight before applying the plug 5 appears as in Fig. 6, the fin 2 extending beyond the end of the pipe and being cut away at its inner edge at 14 so as to fit over the enlarged heads 7 of the plug and to which this projecting portion of the fin is either welded or braced by means of a post screwed or otherwise fastened to the head 7 and riveted to the fin.

In use the round or bearing portions 11 of the connecting bar is revolvably supported in hanger bearings as at 16 usually positioned between each two flights.

It should be noted that the shoulders formed by the enlarged ends 7 of the plugs are well rounded as at 7' so as to present little resistance to the material being conveyed.

In the construction shown in Figs. 7 to 10 no plug is used in the pipe shaft ends, but instead the socket 8' is part of a cast or forged tubular member 8'' driven tightly over the conveyer pipe shaft 1 and circumferentially welded thereto at 15. A loose cap 9' for the socket shown detached in Fig. 9 and endwise in Fig. 10 serves for clamping the heads 12 of the connecting bar (as of Fig. 2 but with suitable size heads) in place and with bolts passing through the notches 13 all as previously described.

The heads of the bar are prevented from endwise movement also by the ends of the pipe 1 falling within the angular corners of the socket as shown at 1' in Fig. 8 which is an end view of the socket of Fig. 7.

In either construction, to remove a flight or dismantle a conveyer, it is merely necessary to take off the caps 9 or 9' and drop out the short connecting bars 11 at both ends of a flight, a matter of a few moments' time as against a protracted job with the construction heretofore in use.

Claims:

1. A spiral conveyer coupling joint comprising a connecting bar, a pair of sockets for said bar, one on the end of each conveyer flight and each provided with a removable side plate whereby said bar may be placed laterally into said sockets and clamped into place by said plates, said sockets being of angular internal form, the ends of said connecting bar similarly formed to fit therein and notched at their edges, and bolts for securing said side plates in place arranged to engage the notches in said bar.

2. A coupling for a spiral conveyer having a hollow core, comprising a plug adapted to fit within and be secured to the core, a socket on the outer end of the plug, a removable side wall to the socket and a coupling bar adapted to fit at its end within the socket and laterally insertable therein and removable therefrom.

3. A coupling for a spiral conveyer having a hollow core, comprising a plug adapted to fit within and be secured to the core, a socket on the outer end of the plug, a removable side wall to the socket and a coupling bar adapted to fit at its end within the socket and laterally insertable therein and removable therefrom, said plug provided with an enlarged head in which said socket is formed.

4. A coupling for a spiral conveyer having a hollow core, comprising a plug adapted to fit within and be secured to the core, a socket on the outer end of the plug, a removable side wall to the socket and a coupling bar adapted to fit at its end within the socket and laterally insertable therein and removable therefrom, said bar provided with an enlarged head at the end fitting in said socket.

5. A coupling for a spiral conveyer comprising a round bar with enlarged angularly sided heads at each end grooved across the corners of the angular sides for the passage of bolts.

6. A coupling for a spiral conveyer having a hollow core, comprising a plug adapted to fit within and be secured to the core, a socket on the outer end of the plug, a removable side wall to the socket and a coupling bar adapted to fit at its end within the socket and laterally insertable therein and removable therefrom, said plug provided with an enlarged head in which said socket is formed and means on said head for securing a conveyer fin thereto.

ROBERT W. RYDER.